United States Patent [19]
Nakata et al.

[11] Patent Number: 4,885,639
[45] Date of Patent: Dec. 5, 1989

[54] APPARATUS FOR ELIMINATING A NOISE SIGNAL

[75] Inventors: Tetsuro Nakata; Ichitaro Sato; Tooru Eto, all of Kanagawa, Japan

[73] Assignee: Sony Corporation, Tokyo, Japan

[21] Appl. No.: 202,822

[22] Filed: Jun. 6, 1988

[30] Foreign Application Priority Data

Jun. 9, 1987 [JP] Japan .................................. 62-143773

[51] Int. Cl.⁴ ............................................ H04N 5/213
[52] U.S. Cl. .................................... 358/167; 358/340; 358/166
[58] Field of Search ................. 358/167, 36, 336, 340, 358/327, 166

[56] References Cited

U.S. PATENT DOCUMENTS

| | | | |
|---|---|---|---|
| 4,091,420 | 5/1978 | Omori | 358/167 |
| 4,291,330 | 9/1981 | Hirai | 358/36 |
| 4,635,120 | 1/1987 | Ichinoi | 358/167 |
| 4,748,498 | 5/1988 | Yamanishi | 358/36 |
| 4,768,094 | 8/1988 | Ichinoi | 358/340 |

*Primary Examiner*—Tommy P. Chin
*Attorney, Agent, or Firm*—Alvin Sinderbrand

[57] ABSTRACT

An apparatus for eliminating a noise from a video signal, employs a first-order type noise eliminating section, for example, a limiter or the like. Such noise eliminating section, by utilizing line correlation, eliminates noise from the video signal in a high frequency region where the signal component level is large, for example, at the portion of a video signal corresponding to an edge portion of the display or picture.

17 Claims, 11 Drawing Sheets

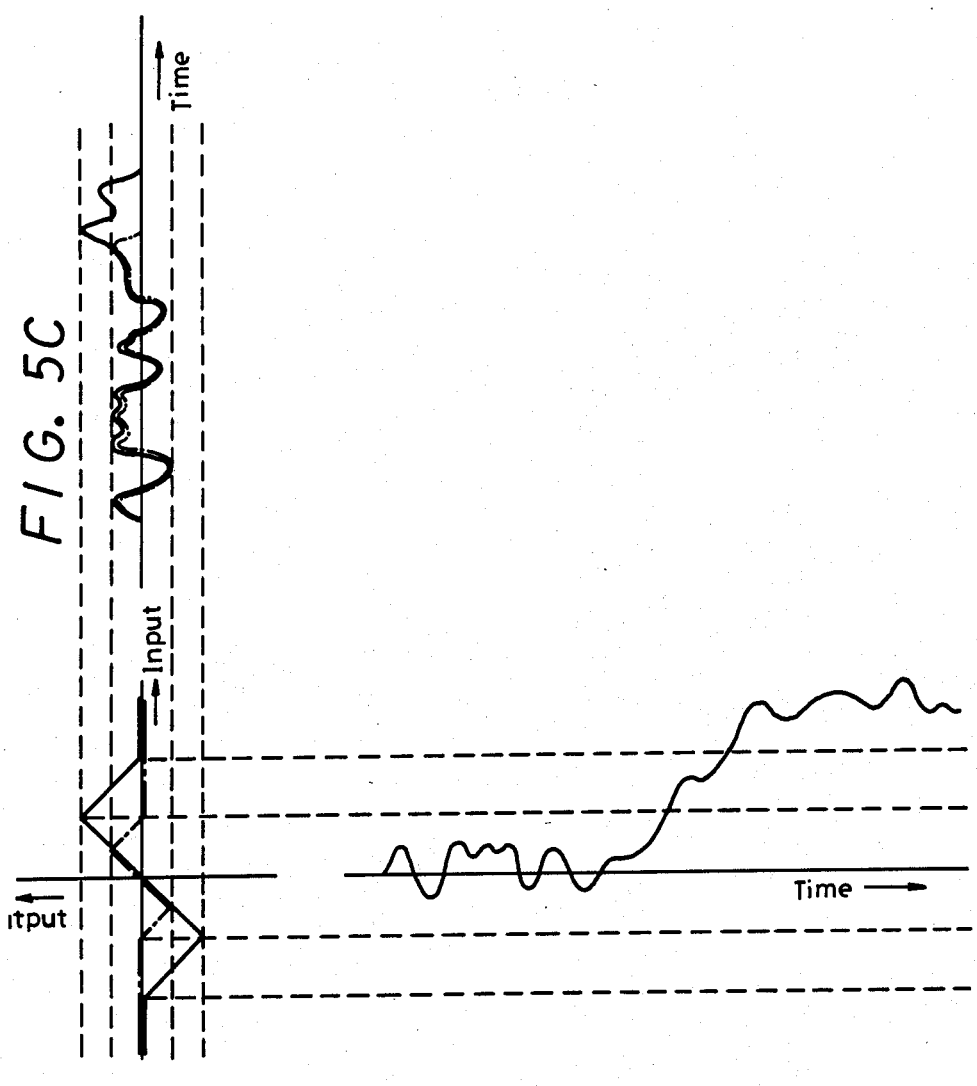

FIG. 8

|  | $t_{-1}$ | $t_0$ | $t_1$ |
|---|---|---|---|
|  | $D_1$ | $D_2$ | $D_3$ |
|  | $D_4$ | $D_5$ | $D_6$ |
|  | $D_7$ | $D_8$ | $D_9$ |

FIG. 9A

|  | $t_{-1}$ | $t_0$ | $t_1$ |
|---|---|---|---|
|  | 0 | 1 | 1 |
|  | 0 | 1 | 1 |
|  | 0 | 1 | 1 |

FIG. 9B

|  | $t_{-1}$ | $t_0$ | $t_1$ |
|---|---|---|---|
|  | 1 | 1 | 0 |
|  | 1 | 1 | 0 |
|  | 1 | 1 | 0 |

FIG. 9C

|  | $t_{-1}$ | $t_0$ | $t_1$ |
|---|---|---|---|
|  | 1 | 1 | 1 |
|  | * | 1 | * |
|  | 1 | 1 | 1 |

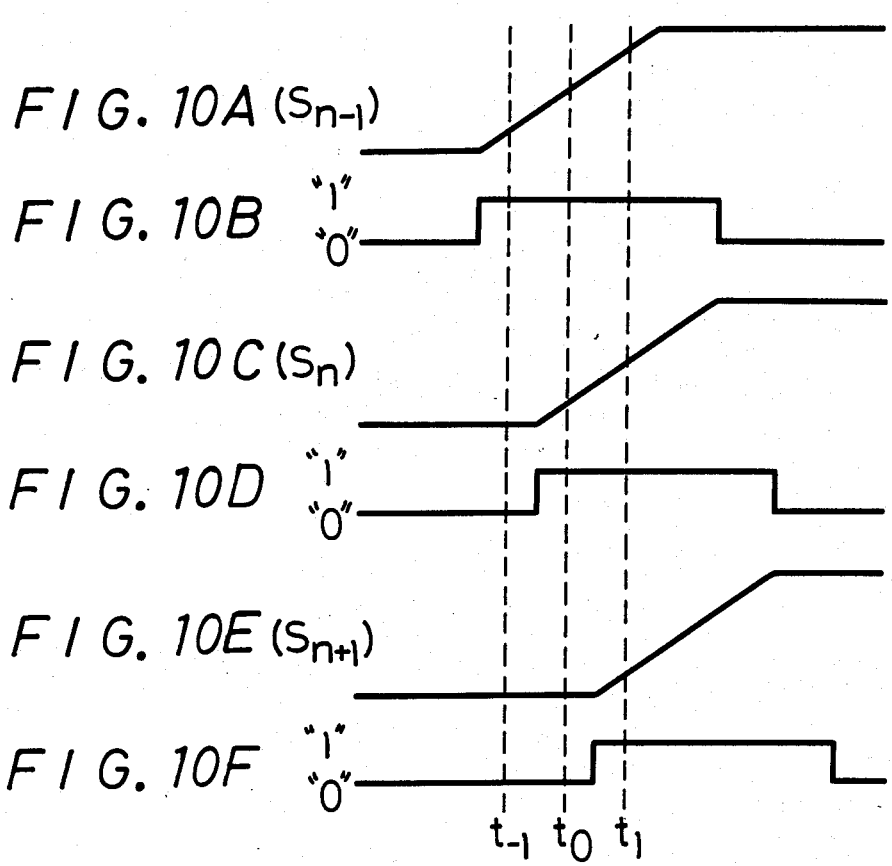

| $t_{-1}$ | $t_0$ | $t_1$ |
|---|---|---|
| 1 | 1 | 1 |
| 1 | 1 | 1 |
| 0 | 1 | 1 |

| $t_{-1}$ | $t_0$ | $t_1$ |
|---|---|---|
| 0 | 1 | 1 |
| 0 | 1 | 1 |
| 0 | 1 | 1 |

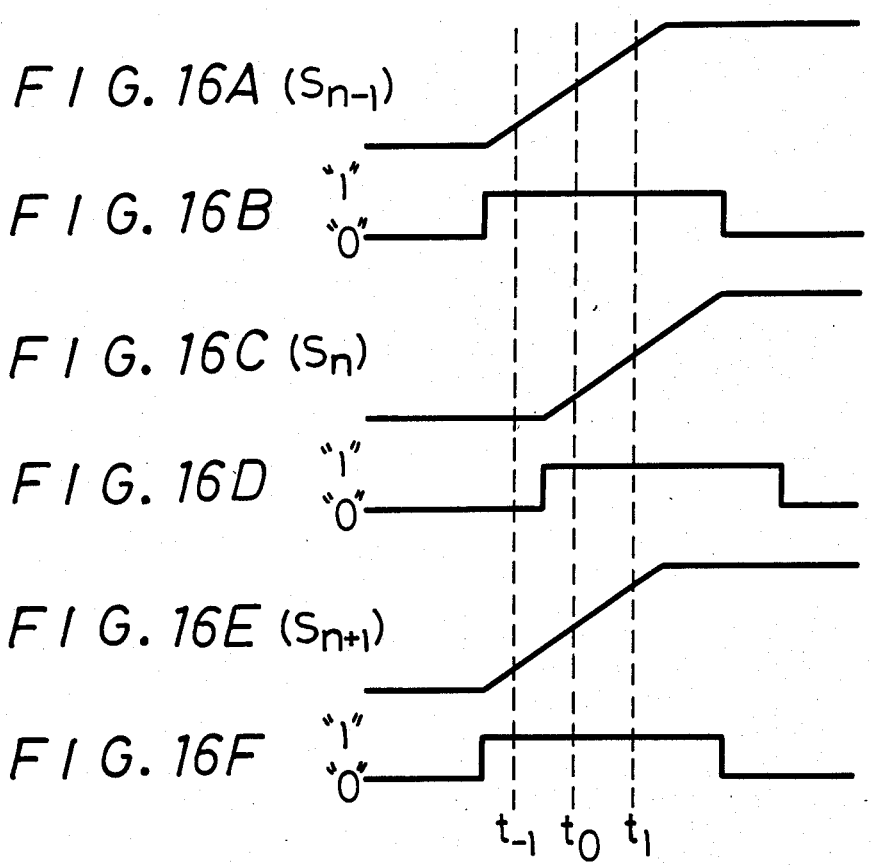

APPARATUS FOR ELIMINATING A NOISE SIGNAL

BACKGROUND OF THE INVENTION

1. Field of the Invention

The present invention relates generally to a noise eliminating circuit and more particularly to a circuit for eliminating a noise from a reproduced video signal from, for example, a video tape recorder (VTR) or the like.

2. Description of the Prior Art

FIG. 1 illustrates an example of a conventional noise eliminating circuit of a first-order configuration type for eliminating a noise from a reproduced video signal from, for example, a video tape recorder (VTR) or the like.

As FIG. 1 shows, a video signal Sv supplied to an input terminal 51 is supplied to a subtracter 52. This video signal Sv also is supplied to the subtracter 52 through a series circuit of a high-pass filter 53 and a limiter 54 forming a noise extracting circuit. The subtractor 52 serves to subtract from the video signal Sv low level high frequency signal components derived from the limiter 54. As a result a noise eliminated video signal is supplied to an output terminal 55 of the subtracter 52.

The conventional noise eliminating circuit shown in FIG. 1 is defective in that a noise at the edge portion of the video signal Sv cannot be eliminated. This defect is explained below. Let it now be assumed that the video signal Sv applied to the input terminal 51 has an edge portion as shown in FIG. 2A, and in which the reference letter N denotes a noise. The output signal from the high-pass filter 53 appears as shown in FIG. 2B and the output signal from the limiter 54 appears as shown in FIG. 2C. In FIG. 2B, TH1 and −TH1 represent the limiting levels. It will be seen that the level of the output signal from the high-pass filter 53 becomes high at the portion where the signal level of the video signal Sv changes greatly, so that the limiter 54 cannot effectively extract the noise N. Thus, the video signal developed at the output terminal 55 contains the noise N at its edge portion as shown in FIG. 2D.

FIG. 3 illustrates another example of a conventional noise eliminating circuit for eliminating a noise from a reproduced video signal for example, from a video tape recorder. This conventional noise eliminating circuit shown in FIG. 3 utilizes a line correlation of the video signal to eliminate a noise.

Referring to FIG. 3, a video signal Sv applied to an input terminal 61 is supplied to a subtracter 62. This video signal Sv also is supplied to a subtracter 63 which receives a noise reduced video signal from the subtracter 62 through a delay line 64 having a delay time of 1H. Here, H represents one horizontal scan period. The subtracter 63 serves to subtract the output signal of the delay line 64 from the video signal Sv to produce a signal formed of the noise component and a line noncorrelation component therefrom. The output signal from the subtracter 63 is supplied to a limiter 65 to extract the noise component. The limiter 65 is a noise extracting circuit which only extracts a noise component with a relatively small amplitude. The thus extracted noise component is then supplied to the subtracter 62 where it is subtracted from the video signal Sv. Since the closed loop circuit averages the video signal over a plurality of horizontal lines, the noise reduced video signal is fed to an output terminal 66 at the output of the subtracter 62.

Because the noise eliminating circuit example shown in FIG. 3 utilizes the line correlation of the video signal, the circuit causes no defect if the present line and the preceding or following line have a correlation therebetween. If on the other hand they have no line correlation therebetween, a component other than the noise component is eliminated from the video signal Sv, and as a result the quality of a reproduced picture is deteriorated.

Japanese laid-open patent application gazette No. 57-185773 discloses a noise eliminating circuit of the kind shown in the example of FIG. 3.

As described above, the noise eliminating circuit shown in FIG. 1 is defective in that the noise at the edge portion of the video signal cannot be eliminated. On the other hand, the noise eliminating circuit shown in FIG. 3 is defective in that the quality of a reproduced picture will be deteriorated when there is no line correlation between the present line and the preceding or following line.

OBJECTS AND SUMMARY OF THE INVENTION

Accordingly, it is an object of the present invention to provide an improved circuit for eliminating a noise from a video signal.

It is another object of the present invention to provide a circuit for eliminating a noise from a video signal which can positively eliminate a noise from a video signal without deteriorating the quality of a reproduced picture.

It is a further object of the present invention to provide a circuit for eliminating a noise from a video signal which can prevent a very small picture portion existing at a low level portion of a video signal from being lost.

According to an aspect of the present invention, there is provided a circuit for eliminating a noise from a video signal comprising:

(a) first means for eliminating noise from a video signal, said first means comprising a first-order circuit configuration;

(b) detecting means for detecting a level in a relatively high frequency portion of the video signal, said detecting means generating a control signal during an interval where said level is greater than a predetermined first threshold level; and (c) means for receiving said control signal for averaging said video signal from said first means over a plurality of lines of the video signal during said interval.

According to another aspect of the present invention, there is provided a circuit for eliminating a noise from an incoming video signal comprising:

(a) means for delaying the incoming video signal by a predetermined number of horizontal lines to form a delayed video signal;

(b) means for deriving a difference signal between the incoming video signal and the delayed video signal;

(c) means for limiting said difference signal to produce a limited difference signal;

(d) means for subtracting the limited difference signal from the incoming video signal;

(e) means for detecting a level change of the incoming video signal and for detecting a line correlation of said level change in adjacent line portions of said incoming video signal, said detecting means generating a control signal when the level change exceeds a predetermined level and the level changes in the adjacent lines indicate line correlation; and (f) means for changing the limiting level of said limiting means in accordance with said control signal.

These and other objects, features and advantages of the present invention will become apparent from the following detailed description of the preferred embodiment to be taken in conjunction with the accompanying drawings, throughout which like reference numerals identify the same or similar parts.

BRIEF DESCRIPTION OF THE DRAWINGS

FIGS. 5A to 5C are schematic representations used to explain the operation of a limiter used in the embodiment shown in FIG. 4;

FIG. 8 is an illustration of a picture pattern used to explain the operation of the example shown in FIG. 7;

FIGS. 9A to 9C are illustrations used to explain when a video signal has a line correlation;

FIGS. 10A to 10F are waveform diagrams used to explain the slant edge portions of a video signal;

FIG. 11 is a schematic representation used to explain the same;

FIGS. 12A to 12F are waveform diagrams used to explain the zig-zag-shaped edge portion of a video signal;

FIG. 13 is a schematic representation used to explain the same;

FIGS. 14A to 14F are waveform diagrams used to explain the vertical edge portion of a video signal;

FIG. 15 is a schematic representation used to explain the same;

FIGS. 16A to 16F are waveform diagrams used to explain the zig-zag-shaped edge portion of a video signal; and FIG. 17 is an illustration used to explain the same.

DETAILED DESCRIPTION OF THE PREFERRED EMBODIMENT

An embodiment of a circuit for eliminating a noise from a video signal according to the present invention is described with reference to FIG. 4. First, the circuit arrangement of this invention will be described.

Figure 1:
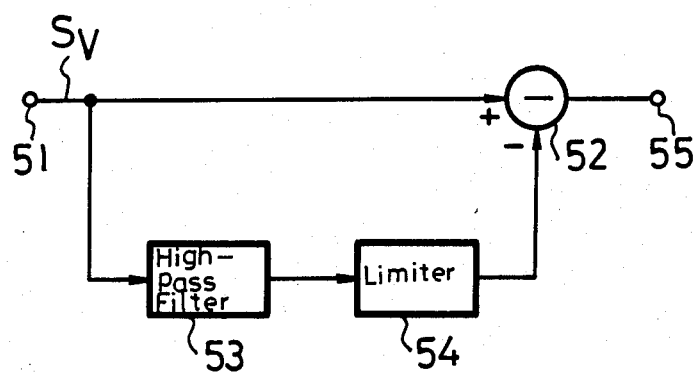
FIG. 1 is a block diagram showing an example of a conventional noise eliminating circuit.
Figure 4:
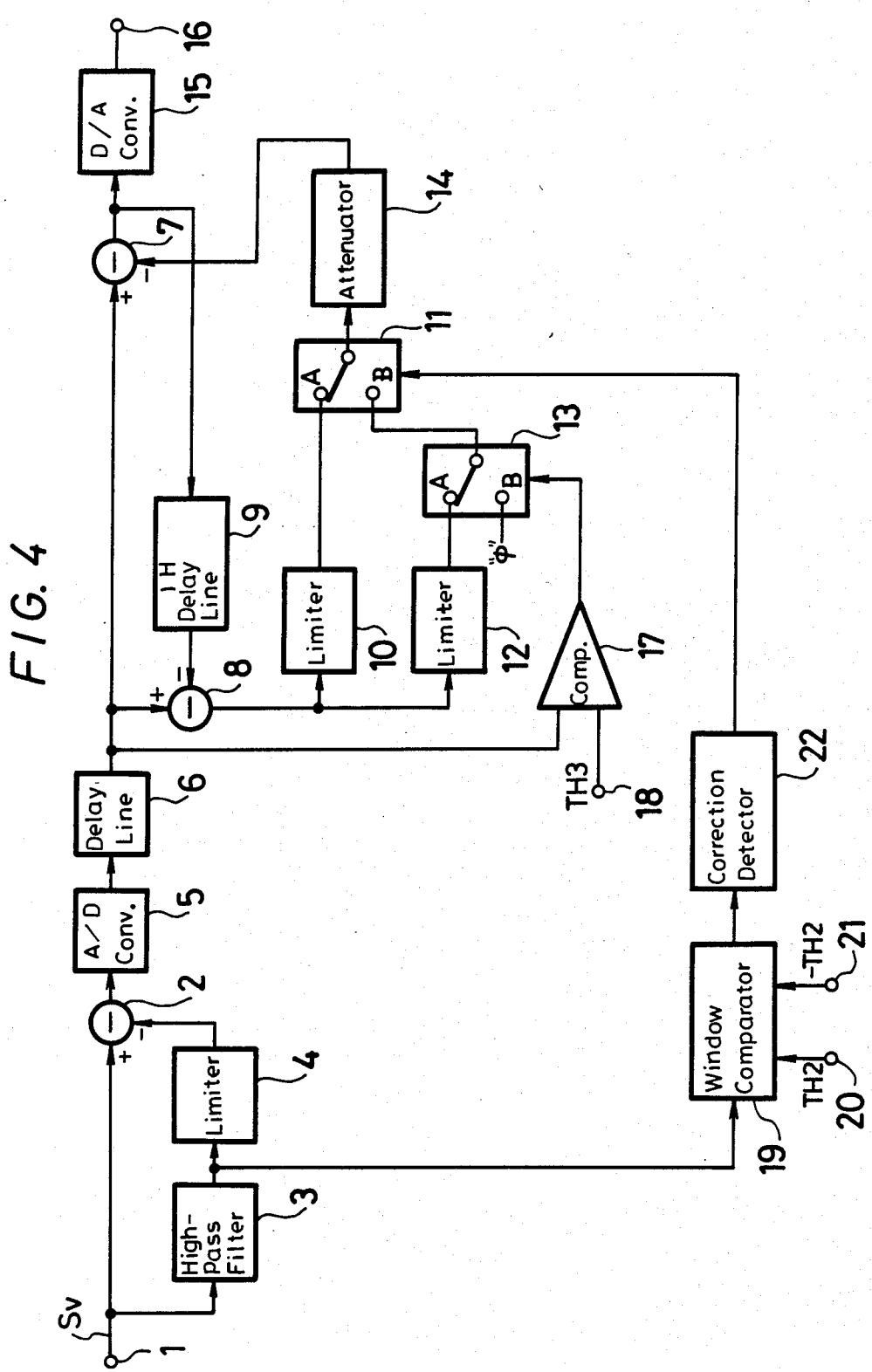
FIG. 4 is a block diagram showing a circuit for eliminating a noise from a video signal according to an embodiment of the present invention.

As FIG. 4 shows, a video signal Sv applied to an input terminal 1 and supplied therefrom to a subtracter 2. This video signal Sv also is supplied to the subtracter 2 through a noise extracting circuit including a high-pass filter 3 and a limiter 4 in series. The subtracter 2 serves to subtract from the video signal Sv low level high frequency signal components output from the limiter 4. The arrangement of the subtracter 2, the high-pass filter 3 and the limiter 4 is the same as that of the noise eliminating circuit shown in FIG. 1. Accordingly, the subtracter 2 produces a video signal from which the noise is eliminated except at the edge portion.

The video signal output from the subtracter 2 is converted into a corresponding digital signal by an analog-to-digital (A/D) converter 5. The resultant digital signal is then supplied through a time adjusting delay line 6 to a subtracter 7. The video signal from the delay line 6 also is supplied to a subtracter 8. The subtracter 8 in addition receives the video signal output from the subtracter 7 through a delay line 9 having a delay time of one horizontal line period (1H). The subtracter 8 subtracts the output signal of the 1H delay line 9 from the video signal received from the delay line 6 to form an output signal of subtracter 8.

The output signal from the subtracter 8 is supplied through a limiter 10 to a fixed contact A of a switching circuit 11 and through a limiter 12 to a fixed contact A of a switching circuit 13. The limiter 10 is a noise extracting circuit formed of, for example, a read-only memory (ROM). The limiting characteristic of limiter 10 is represented by the solid line in FIG. 5A. When the output signal from the subtracter 8, as shown by the solid line in FIG. 5B, is supplied to the limiter 10, the limiter 10 produces a noise signal as shown by the solid line in FIG. 5C. The limiter 12 also is a noise extracting circuit and is also formed of, for example, a ROM. The limiting characteristic of the limiter 12 is shown by a one-dot chain line in FIG. 5A. The limiting level of the limiter 12 is selected to be smaller than that of the limiter 10. When the output signal from the subtracter 8, as shown by the solid line in FIG. 5B is supplied to the limiter 12, the limiter 12 produces a noise signal shown by a one-dot chain line in FIG. 5C. A zero signal "φ" is supplied to the other fixed contact B of the switching circuit 13. The output signal from the switching circuit 13 is supplied to the other fixed contact B of the switching circuit 11. The output signal from this switching circuit 11 is supplied to the subtracter 7 through an attenuator or coefficient circuit 14. This attenuator 14 is used for reducing the possibility that the signal itself is subtracted from the video signal as a noise when there is no line correlation. As a result the quality of the reproduced picture is prevented from being deteriorated. The attenuation ratio or coefficient of the attenuator 14 is selected to be, ¾, ½ or the like. In the subtracter 7, the output signal of the attenuator 14 is subtracted from the video signal supplied from the delay line 6. The video signal from the subtracter 7 then is supplied through a digital-to-analog (D/A) converter 15 to an output terminal 16.

While the plurality of limiters 10 and 12 are provided to be changed-over by the switching circuit 11 in this embodiment, the limiters 10 and 12 may be replaced with a limiter in which the limiting level of which can be varied. The limiting level of such a limiter may be directly controlled by an output from a correlation detector 22 which will be described later.

Further, while the attenuation ratio of the attenuator 14 is fixed in this embodiment, such an attenuation ratio may be varied by the output signal from the correlation detector 22. In such an embodiment, when the limiting level of the limiter is large, the attenuation ratio is increased, and when it is small, the attenuation ratio is decreased, thus enhancing the noise eliminating effect of the noise eliminating circuit.

The video signal from the delay line 6 is supplied to a one input terminal of a comparator 17, and the comparator 17 receives at its other input terminal a threshold or reference voltage TH3 from a terminal 18. This reference voltage TH3 is selected to be ½ to ¼ of the maximum amplitude of, for example, the video signal Sv. The output signal from the comparator 17 is supplied to the switching circuit 13 as a switching control signal. Specifically, when the level of the video signal from the delay line 6 is higher than the reference voltage TH3, the switching circuit 13 is connected to the fixed contact A, while when the level of the video signal is lower than the reference voltage TH3, the switching circuit 13 is connected to the fixed contact B.

While the switching circuit 13 is switched in response to the output signal from the comparator 17 in this embodiment as described above, a variation is possible in which the output signal from the limiter 12 is directly supplied to the switching circuit 11 so as to enable the limiter 12 to operate even in the case where the level of the video signal is low.

Figure 6A:
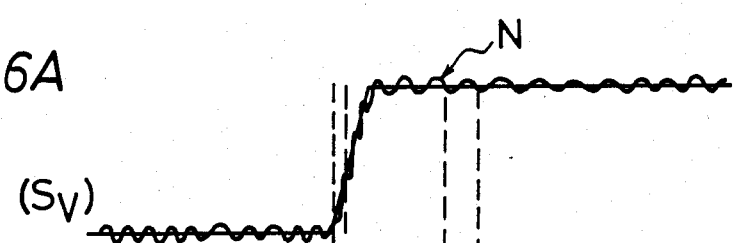
FIGS. 6A to 6D are schematic representations used to explain the operation of a window comparator used in the embodiment shown in FIG. 4.
Figure 6B:
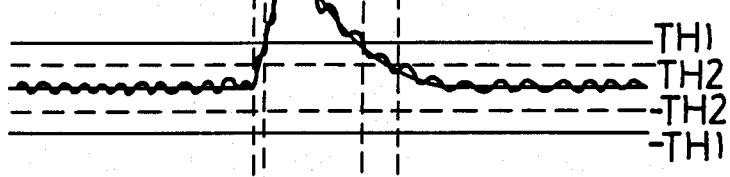
Figure 6C:
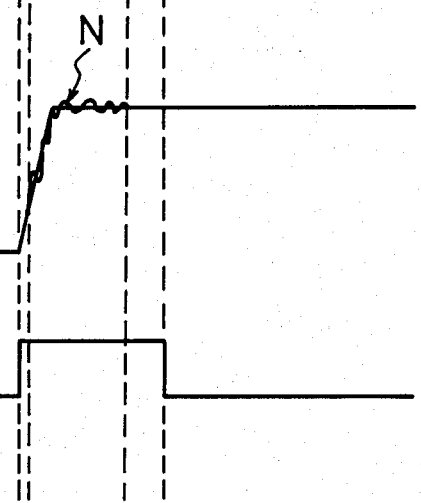
Figure 6D:
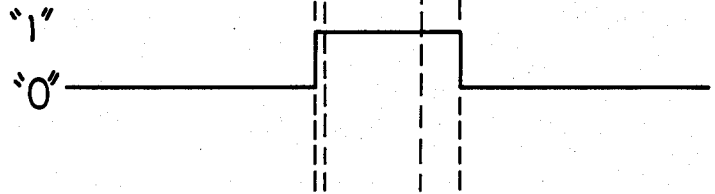

The output signal from the high-pass filter 3 is supplied to a window comparator 19. The window comparator 19 receives at its terminals 20 and 21 reference voltages TH2 and −TH2, respectively. The levels of the reference voltages TH2 and −TH2 are selected to be smaller than the limiting levels TH1 and −TH1 of the limiter 4. The window comparator 19 generates a signal of high level "1" when the output signal from the high-pass filter 3 exceeds the reference voltages TH2 and −TH2, while it produces a signal of low level "0" otherwise. For example, when the video signal Sv applied to the input terminal 1 has the edge portion as shown in FIG. 6A, high-pass filter 3 generates the output signal shown in FIG. 6B. Thus, the window comparator 19 produces a signal which goes to high level "1" in response to the edge portion of the video signal Sv as shown in FIG. 6D. As described above, the subtracter 2 generates the video signal shown in FIG. 6C in which the noise N remains at the edge portion of the video signal Sv. However, because the levels of the reference voltages TH2 and −TH2 are selected to be smaller than those of the limiting levels TH1 and −TH1 of the limiter 4, the output signal from the window comparator 19 goes to high level "1" in a wider range than the interval where the noise N is not eliminated from the video signal Sv.

While the output signal from the high-pass filter 3 is supplied to the window comparator 19, a variation is possible in which the video signal Sv from the input terminal 1 or the output from the subtracter 2 is supplied to the window comparator 19 through a high-pass filter provided separately.

The outgoing signal from the window comparator 19 is supplied to a correlation detector 22. The correlation detector 22 detects a line correlation (vertical correlation) at the edge portion of the incoming video signal Sv. This correlation detector 22 is constructed, for example, as shown in FIG. 7.

Figure 7:
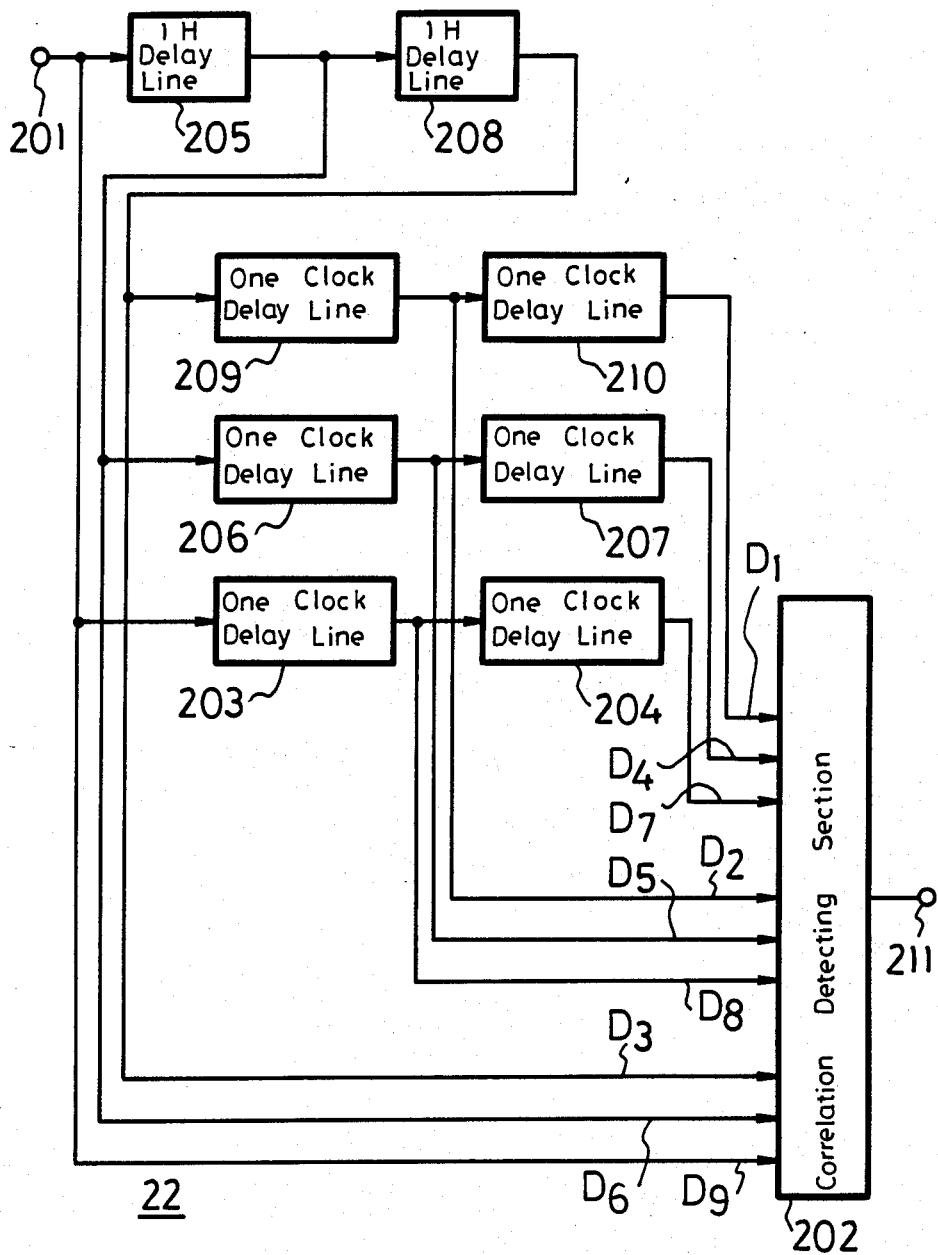
FIG. 7 is a block diagram showing an example of a correlation detector used in the embodiment of the present invention shown in FIG. 4.

Referring to FIG. 7, the output signal from the window comparator 19 (FIG. 4) is supplied to an input terminal 201. Such signal is supplied to a correlation detecting section 202, to a delay line 203 and to a delay line 205. The output signal from the delay line 203 is supplied to the correlation detecting section 202 and to a delay line 204. The output signal from the delay line 204 is supplied to the correlation detecting section 202.

The output signal from the delay line 205 is supplied to the correlation detecting section 202, to a delay line 206, and to a delay line 208. The output signal from the delay line 206 is supplied to the correlation detecting section 202 and to a delay line 207. The output signal from the delay line 207 is supplied to the correlation detecting section 202.

The output signal from the delay line 208 is input to the correlation detecting section 202 and to a delay line 209. The output signal from the delay line 209 is supplied to the correlation detecting section 202 and to a delay line 210 whose output signal is supplied to the correlation detecting section 202.

Each of the delay lines 205 and 208 is arranged to have a delay time of one horizontal period (1H), while each of the delay line 203, 204, 206, 207, 209 and 210 is arranged to have a delay time of one clock period.

The output signal from the delay line 206 is shown as a signal D5. When signal D5 is at time point $t_0$ for the present line, the correlation detecting section 202 receives the signal D5 at the time point $t_0$ on the present line, while receiving a signal D4 at time point $t_{-1}$ of one clock period before the time point of D5 and a signal D6 at time point $t_1$ of one clock after the time point of D5. Further, the correlation detecting section 202 simultaneously receives corresponding one-line-preceding signals D1, D2 and D3 and one-line-succeeding signals D7, D8 and D9 (see FIG. 8).

The correlation detecting section 202 detects a line correlation at the edge portion of the video signal on the basis of the signals D1 to D9. For example, when the signals D1 to D9 have the patterns shown in FIGS. 9A, 9B and 9C (in FIG. 9C, a mark * may be any one of "0" and "1"), the correlation detecting section 202 detects that the edge portion of the video signal has line correlation, and outputs a signal of, for example, high level "1" to an output terminal 211 (see FIG. 7). When on the other hand the signals D1 to D9 have other patterns, the correlation detecting section 202 determines that the edge portion of the video signal has no line correlation, thus supplying a signal of, for example, low level "0" to the output terminal 211. By way of example, with respect to video signal Sv when a one-line-preceding signal, $S_{n-1}$, a signal on the present line, $S_n$, and a one-line-succeeding signal, $S_{n+1}$, have slant edge portions as shown in FIGS. 10A, 10C and 10E, respectively, window comparator 19 signals (see FIG. 4) corresponding to the respective lines are as shown in FIGS. 10B, 10D and 10F. The resulting patterns of the signals D1 to D9 are presented as shown in FIG. 11, and the correlation detecting section 202 determine that the edge portion of the video signal has no line correlation. Further, when the one-line-preceding signal $S_{n-1}$ the signal on the present line $S_n$ and the one-line-succeeding signal $S_{n+1}$ are respectively presented as shown in FIGS. 12A, 12C and 12E and the line connecting the edge portions thereof becomes a curved line, the window comparator 19 signals (FIG. 4) corresponding to the respective lines are as shown in FIGS. 12B, 12D and 12F, respectively. The resulting patterns of the signals D1 to D9 then are as shown in FIG. 13, and again the line correlation detecting section 202 to determines that the edge portion of the video signal has no line correlation.

However when, the one-line-preceding signal $S_{n-1}$, the signal on the present line $S_n$ and the one-line-succeeding line $S_{n+1}$ are presented as shown in FIGS. 14A, 14C and 14E, respectively and the edge portions thereof are connected together to present a vertical line, window comparator 19 signals corresponding to the respective lines are as shown in FIGS. 14B, 14D and 14F, respectively. The resulting patterns of the signals D1 to D9 are as shown in FIG. 15, and now the line correlation detecting section 202 determines that the edge portion of the video signal has a line correlation. Furthermore, when one-line-preceding signal $S_{n-1}$, the signal on the present line $S_n$, and the one-line-succeeding line $S_{n+1}$ are presented as shown in FIGS. 16A, 16C and 16E, respectively and the edge portions thereof are connected together to present a so-called zigzag-line form, window comparator 19 signals corresponding to the respective lines are as shown in FIGS. 16B, 16D and 16F. The resulting patterns of the signals D1 to D9 are presented as shown in FIG. 17, and the line correlation detecting section 202 also determines that the edge portion of the video signal Sv has a line correlation.

While the correlation detector 22 shown in FIG. 7 utilizes the sample pattern formed by 3 samples provided in the vertical direction and 3 samples provided in the horizontal direction (3×3) to detect the line correlation, the sample pattern may be formed by samples of more than or less than 3×3 samples. The sample pattern must be formed by at least 2 samples in the vertical direction and at least 1 sample in the horizontal direction (2×1). While the correlation detector 22 produces the detecting signal with a predetermined delay time, the above-mentioned delay line 6 acts to adjust such a predetermined delay time of the detecting signal.

The detecting output signal from the correlation detector 22 is supplied to the switching circuit 11 as a switching control signal. Specifically, when the detecting output signal from the correlation detector 22 goes to a high level "1", the switching circuit 11 is connected to the fixed contact A, while when there exists no line correlation the detecting output signal from the correlation detector 22 goes to low level "0", and circuit 11 is connected to the fixed contact B.

Figure 3:
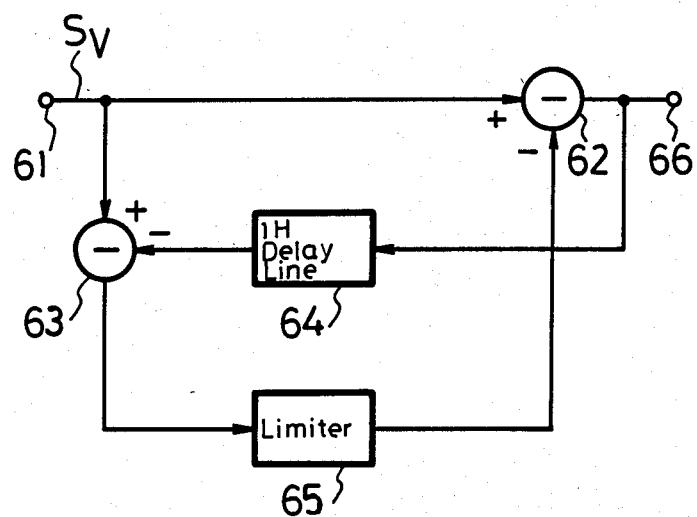
FIG. 3 is a block diagram showing another example of a conventional noise eliminating circuit.
Figure 2A:
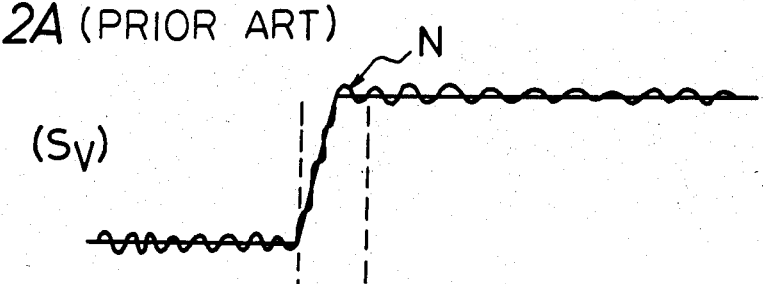
FIGS. 2A-2D are waveform diagrams used to explain the example of FIG. 1.
Figure 2B:
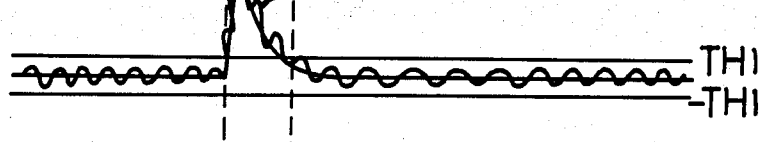
Figure 2C:
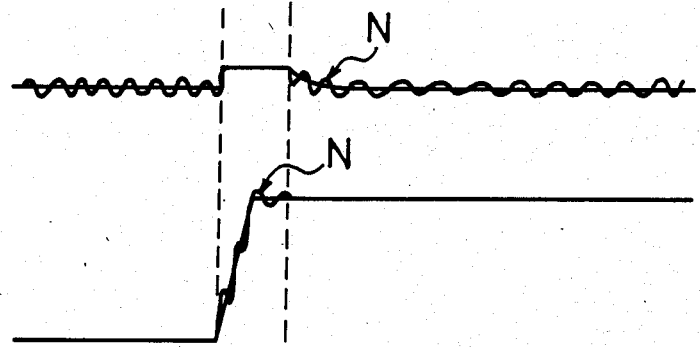
Figure 2D:

The noise eliminating circuit of this embodiment is constructed as described above, such that when the video signal Sv has line correlation at its edge portion, the switching circuit 11 is connected to the fixed contact A as shown in FIG. 4. Consequently, the video signal from the subtracter 2 is supplied to the signal processing circuit formed of the subtracters 7 and 8, the delay line 9, the limiter 10 and the attenuator 14. The active circuit arrangement of this processing circuit thus is reduced to that of the conventional noise eliminating circuit shown in the example of FIG. 3, wherein the noise eliminating processing is similarly executed by utilizing line correlation. Thus, at the output side of the subtracter 7 and hence the output terminal 16, there is developed a video signal which is free from the noise N (FIG. 6C) which still exists in the video signal derived from the subtracter 2.

Further, for processing the edge portion of the video signal Sv which has no line correlation, or for the other portions of the video signal, the switching circuit 11 is connected to the fixed contact B. The switching circuit 13 is connected to the fixed contact A when the level of the video signal from the delay line 6 is higher than the reference level TH3 and hence the level of the video signal Sv is large. As a result the video signal from the subtracter 2 is supplied to the processing circuit formed of the subtracters 7 and 8, the delay line 9, the limiter 12 and the attenuator 14. Since the active circuit arrangement of this processing circuit is reduced to that of the noise eliminating circuit shown in FIG. 3, the conventional noise eliminating processing utilizing the line correlation is similarly executed. The output terminal 16 receives a video signal in which much more noise is reduced than from the video signal derived from the subtracter 2. Because the limiting level of the limiter 12 is selected to be lower than that of the limiter 10 as set forth previously, the noise eliminating effect is not as powerful relative to the case where the video signal has the line correlation component at the edge portion. On the other hand, when the video signal has no line correlation there is less deterioration of the quality of the reproduced picture. When on the other hand the video signal level output from the delay line 6 is lower than the reference level TH3, and hence the level of the video signal Sv is small, the switching circuit 13 is connected to the fixed contact B so that the video signal from the subtracter 2 is supplied to the output terminal without being subjected to the noise eliminating processing. Thus, it is possible to prevent a portion of a very fine picture (for example, hairs and so on) existing at the low level portion of the video signal from being lost. To the human eye, for a signal of relatively low brightness the very fine picture pattern can be identified while for a signal of high brightness the very fine picture pattern cannot be identified without difficulty. Thus, when the very fine picture pattern existing at the low level portion of the video signal Sv is lost, the quality of a reproduced picture is deteriorated considerably.

While the noise at the edge portion of the video signal cannot be eliminated fully by the circuit arrangement of the subtracter 2, the high-pass filter 3 and the limiter 4, the noise can be eliminated by the processing circuit formed of the subtracters 7 and 8, the delay line 9, the limiter 10 and the attenuator 14 utilizing line correlation. Thus a video signal which has the edge portion noise positively eliminated can be obtained at the output terminal 16. However, when the video signal has no line correlation at the edge portion, the noise eliminating processing utilizing the line correlation is reduced or not executed at all so that the quality of the reproduced picture can be prevented from being deteriorated. Alternatively, when the video signal has no line correlation at the edge portion or the level of the video signal Sv is low at its portions other than the edge portion, the noise eliminating processing utilizing the line correlation can be inhibited so that the very fine picture pattern existing at the low level portion of the video signal Sv can be prevented from being lost, still preventing the quality of the reproduced picture from being deteriorated.

According to the present invention, as set forth above, since the noise eliminating processing utilizing the line correlation is executed only during the interval of the edge portion of the video signal, it is possible to positively eliminate the noise at the edge portion of the video signal which cannot be eliminated by the noise eliminating section of a first-order configuration which utilizes, for example, a limiter. Also, it is possible to prevent the quality of the reproduced picture from being deteriorated unnecessarily during other intervals than the interval of the edge portion.

Although a single preferred embodiment of the present invention has been described above, it will be apparent that many modifications and variations thereof could be effected by one with ordinary skill in the art without departing from the spirit and scope of the invention as defined by the appended claims.

We claim as our invention:

1. A circuit for eliminating a noise from a video signal comprising:

first means for eliminating a noise from the video signal, said first means having a first-order circuit configuration;

detecting means for detecting a level in a relatively high frequency portion of the video signal, said detecting means generating a control signal during an interval in which said level is greater than a predetermined first threshold level; and averaging means controlled by said control signal for averaging said video signal over a plurality of lines of the video signal during said interval.

2. The circuit according to claim 1, in which said detecting means includes a correlation detector for detecting the correlation of said control signal in a plurality of horizontal intervals.

3. The circuit according to claim 2, in which said first means includes a high-pass filter for cutting off a relatively low frequency portion of the video signal, a limiter for limiting the video signal from said high-pass filter at a predetermined second threshold level and a subtracter for subtracting the limited video signal from the video signal to thereby eliminate the noise therefrom, and in which said first threshold level is selected smaller than said predetermined second threshold level.

4. The circuit according to claim 3, in which said detecting means is connected with an output of said high-pass filter included in said first means.

5. The circuit according to claim 1, in which said averaging means includes means for delaying the video signal by a predetermined number of horizontal intervals, means for deriving a difference signal which is the difference between the video signal from said first means and the delayed video signal, means for limiting said difference signal and subtracting means for subtracting said limiting difference signal from the video signal.

6. The circuit according to claim 5, in which the output of said subtracting means is connected with the input of said delaying means to feed the video signal back to said means for deriving the difference signal.

7. The circuit according to claim 6, in which said limiting means comprises a plurality of limiters having different limiting levels, respectively.

8. The circuit according to claim 7, in which said averaging means further includes first switch means for selectively connecting outputs of said plurality of limiters with said subtracting means in accordance with said control signal such that the limiter which has a relatively high limiting level is connected with said subtracting means during said interval.

9. The circuit according to claim 8, in which said averaging means further includes second switch means connected between said first switch means and one of said limiters which has a relatively low limiting level, and a video level comparator for comparing a level of the video signal with another predetermined threshold level, said comparator generating a switching signal when the level of the video signal is higher than said other predetermined threshold level, wherein said one limiter which has a relatively low limiting level is connected with said first switch means while said switching signal is generated.

10. The circuit according to claim 9, in which an attenuator is provided to attenuate the level of the limited difference signal.

11. The circuit according to claim 10, in which an attenuation ratio in said attenuator is varied in accordance with said control signal.

12. A circuit for eliminating a noise from an incoming video signal comprising:

means for delaying an incoming video signal by a predetermined number of horizontal lines to form a delayed video signal;

means for deriving a difference signal corresponding to a difference between the incoming video signal and the delayed video signal;

limiting means for limiting said difference signal to produce a limited difference signal;

means for subtracting the limited difference signal from the incoming video signal;

detecting means for detecting a level change of the incoming video signal and a line correlation of said level change is adjacent lines of the incoming video signal, said detecting means generating a control signal when the level change exceeds a predetermined level and the level changes in the adjacent lines indicate the line correlation; and means for changing the limiting level of said limiting means in accordance with said control signal.

13. The circuit according to claim 12, in which said limiting means includes a plurality of limiters having different limiting levels, respectively.

14. The circuit according to claim 13, in which said means for changing the limiting level includes first switch means for selectively connecting outputs of said plurality of limiters with said subtracting means such that one of said limiters which has a relatively high limiting level is connected with said subtracting means when said control signal is generated and such that another of said limiters which has a relatively low limiting level is connected otherwise.

15. The circuit according to claim 14, in which said means for changing the limiting level further second switch means connected between said first switch means and said one limiter having a relatively low limiting level, and a comparator for comparing a level of the incoming video signal with a threshold level, said comparator generating a switching signal when the level of the incoming video signal is higher than said threshold level, so that said one limiter having a relatively low limiting level is connected with said first switch means only during an interval where said switching signal is generated therein.

16. The circuit according to claim 15, in which an attenuator is provided to attenuate the level of the limited difference signal.

17. The circuit according to claim 16, in which an attenuation ratio in said attenuator is varied in accordance with said control signal.

* * * * *